US011153536B2

(12) United States Patent
Gasior et al.

(10) Patent No.: US 11,153,536 B2
(45) Date of Patent: Oct. 19, 2021

(54) IMAGING SYSTEM WITH MULTIPLE ANGLES OF VIEW

(71) Applicant: HOPVUE INC., Mississauga (CA)

(72) Inventors: Edward Gasior, Mississauga (CA); Steven Gasior, Mississauga (CA)

(73) Assignee: HOPVUE INC., Mississauga (CA)

( * ) Notice: Subject to any disclaimer, the term of this patent is extended or adjusted under 35 U.S.C. 154(b) by 0 days.

(21) Appl. No.: 17/061,742

(22) Filed: Oct. 2, 2020

(65) Prior Publication Data

US 2021/0105441 A1   Apr. 8, 2021

Related U.S. Application Data

(60) Provisional application No. 62/909,409, filed on Oct. 2, 2019.

(51) Int. Cl.
| | |
|---|---|
| *H04R 1/08* | (2006.01) |
| *H04N 7/18* | (2006.01) |
| *H04N 5/247* | (2006.01) |
| *G06F 3/01* | (2006.01) |
| *H04N 5/232* | (2006.01) |
| *H04N 5/76* | (2006.01) |
| *H04R 3/00* | (2006.01) |

(52) U.S. Cl.
CPC ............. *H04N 7/183* (2013.01); *G06F 3/017* (2013.01); *H04N 5/23216* (2013.01); *H04N 5/23229* (2013.01); *H04N 5/247* (2013.01); *H04N 5/76* (2013.01); *H04R 1/08* (2013.01); *H04R 3/00* (2013.01)

(58) Field of Classification Search
None
See application file for complete search history.

(56) References Cited

U.S. PATENT DOCUMENTS

| | | | | |
|---|---|---|---|---|
| 2001/0028399 A1* | 10/2001 | Conley | .................. | H04N 5/262 348/239 |
| 2006/0038818 A1* | 2/2006 | Steele | .................. | H04N 21/435 345/440 |
| 2017/0150048 A1* | 5/2017 | Tokutake | .................. | G06T 7/70 |

\* cited by examiner

*Primary Examiner* — Eileen M Adams
(74) *Attorney, Agent, or Firm* — Perry + Currier Inc.

(57) ABSTRACT

An example imaging system includes: a first imaging device oriented towards a central target to capture first video data representing the central target from a first angle of view; a set of further imaging devices oriented towards the central target to capture further video data representing the central target from further angles of view; and a control unit to: control the first imaging device and the set of further imaging devices to synchronously capture the first video data and the further video data; in response to a video request, provide, to a client device, a video stream of the first video data representing the central target from the first angle of view; and in response to an angle-change request, switch the video stream to second video data representing the central target, the second video data selected from the further video data.

13 Claims, 8 Drawing Sheets

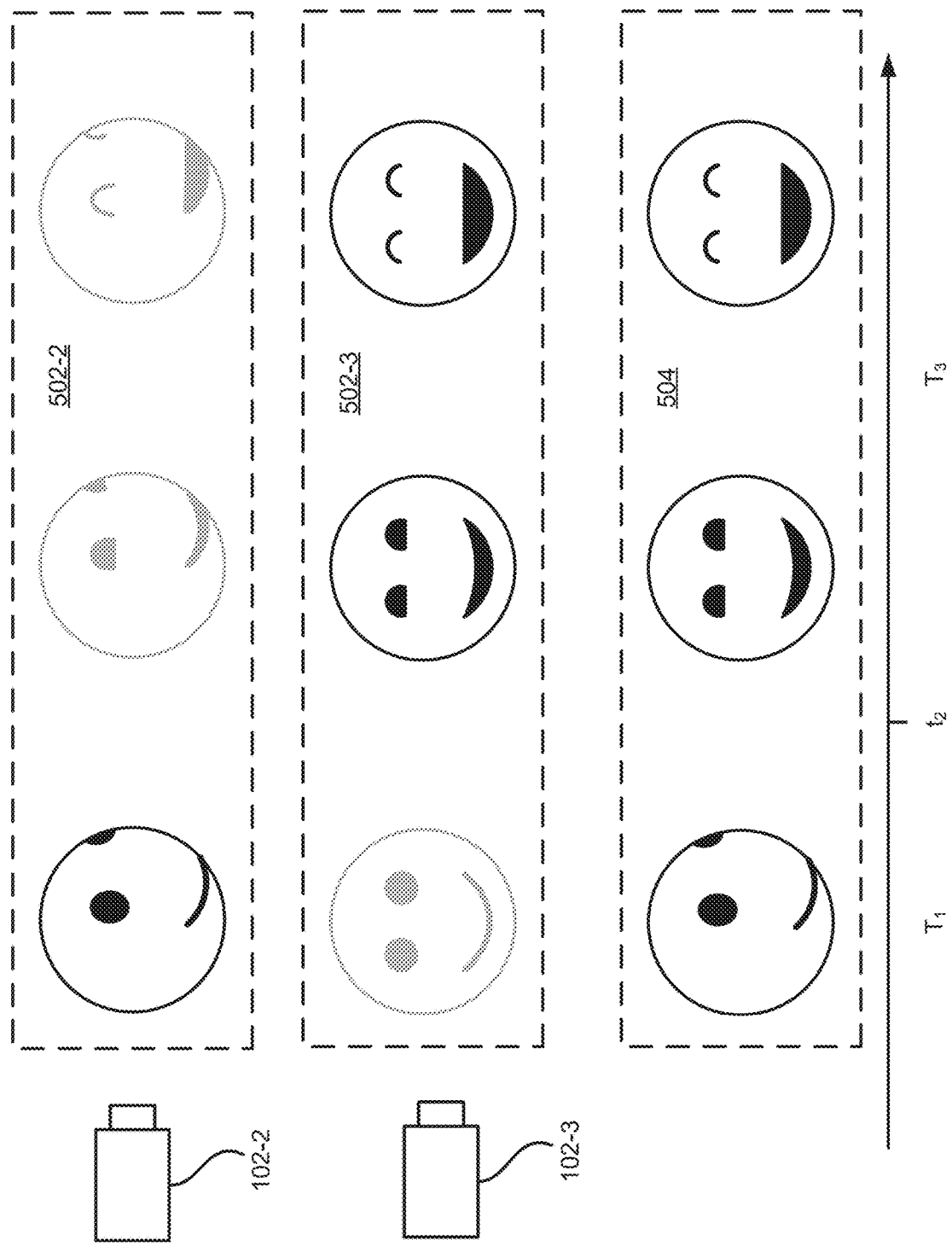

IMAGING SYSTEM WITH MULTIPLE ANGLES OF VIEW

FIELD

The specification relates generally to imaging systems, and more particularly to imaging systems with multiple angles of view.

BACKGROUND

When capturing media, many media systems capture media from a single perspective. Media systems which capture multiple media streams often lack synchronicity. Further, users must manually determine which media stream they wish to view.

SUMMARY

According to an aspect of the present specification, an imaging system with multiple angles of view is provided. The imaging system includes: a first imaging device oriented towards a central target to capture first video data representing the central target from a first angle of view; a set of further imaging devices oriented towards the central target to capture further video data representing the central target from further angles of view; and a control unit interconnected with the first imaging device and the set of further imaging devices, the control unit to: control the first imaging device and the set of further imaging devices to synchronously capture the first video data and the further video data; in response to a video request, provide, to a client device, a video stream of the first video data representing the central target from the first angle of view; and in response to an angle-change request, switch the video stream to second video data representing the central target, the second video data selected from the further video data.

According to another aspect of the present specification, a computing device for viewing a video stream from multiple angles of view is provided. The computing device includes: a display; an input device; a memory; and a processor interconnected with the display, the input device and the memory, the processor configured to: receive, at the input device, a video request to view video content of a central target; in response to the video request, obtain a set of video streams of the central target, each video stream representing the central target from a different angle of view; select a first video stream from the set to display at the display; receive, at the input device, an angle-change request; select a second video stream from the set to display; and switch the video content from the first video stream from the second video stream.

According to another aspect of the present specification, a method for viewing a video stream from multiple angles of view is provided. The method includes: displaying a first video stream representing a central target from a first angle of view; receiving an angle-change request including a direction; obtaining a spatial plan of video streams in a set of video streams, the set of video streams including the first video stream; determining a source position of the first video stream; selecting, based on the spatial plan, a second video stream from the set of video streams, wherein the second video stream has a closest position to the source position in the direction defined in the angle-change request; and displaying the selected second video stream.

BRIEF DESCRIPTION OF DRAWINGS

Implementations are described with reference to the following figures, in which:

FIG. 5B depicts a schematic of video streams during the performance of the method of FIG. 4B.

DETAILED DESCRIPTION

An example imaging system provides video streams from multiple angles of view. The system includes imaging devices oriented at different angles around a central target to obtain video data from multiple angles of view. The imaging devices are controlled by a central control unit to enable synchronicity between the video data captured by the imaging devices. Users may view the video streams and may interactively select different angles of view of the central target using touch input or keyboard input. Based on the synchronicity of the video data, users may switch seamlessly between video streams without breaking the video stream. Further, based on the structured spatial plan of the sources of the video streams, users may intuitively interact with the video, for example using gestures, and the processor may resolve the gestures to determine a next video stream and angle of view to display.

Figure 1:
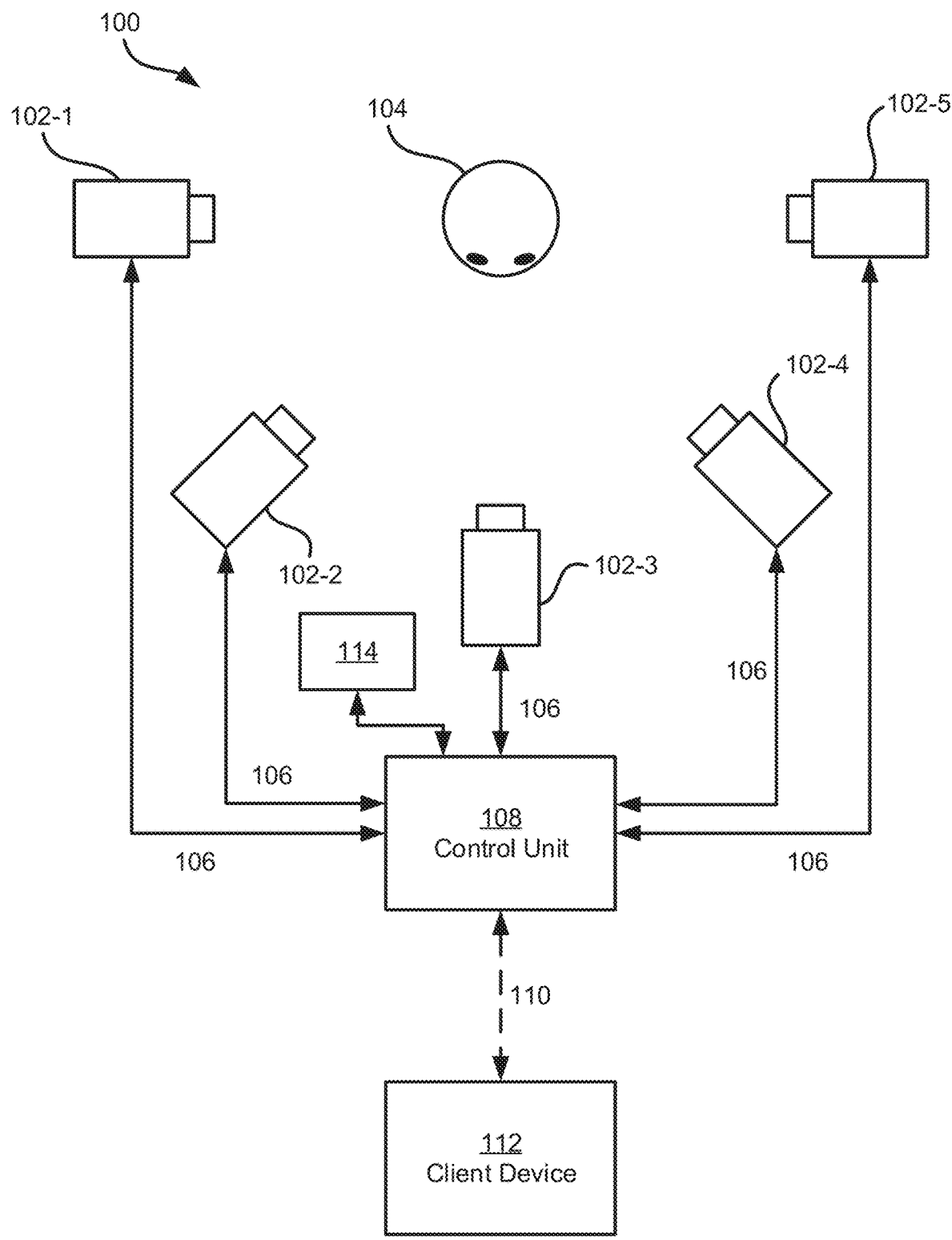
FIG. 1 depicts a schematic diagram of an example imaging system with multiple angles of view.

FIG. 1 depicts an imaging system 100 to provide video streams from multiple angles of view. The system 100 includes a plurality of imaging devices 102-1, 102-2, 102-3, 102-4, and 102-5 (referred to generically as an imaging device 102, and collectively as imaging devices 102) oriented to capture image data representing a central target 104. Each of the imaging devices 102 is interconnected with a control unit 108. The control unit 108 is in communication with a client device 112 via a communication link 110, illustrated in the present example as including wireless links.

The imaging devices 102 may be optical cameras (i.e., capturing visible light) configured to capture video data. The imaging devices 102 are oriented towards the central target 104 to capture video data representing the central target 104. More particularly, each imaging device 102 is oriented towards the central target 104 at a different angle of view, such that the video data obtained from, for example, the first imaging device 102-1, represents the central target 104 from a first angle of view, while the video data obtained from the second imaging device 102-2 represents the central target 104 from a second angle of view, different from the first. The central target 104 may be a single object, as in the present example, or, in other examples, may represent a defined space including more than one component, such as a region of a stage including multiple performers, or the like. In the present example, the imaging devices 102 are approximately equidistant from the central target 104. In other examples, the imaging devices 102 may be closer to or further from the central target 104 relative to one another. Further, as can be seen in the example of FIG. 1, the imaging devices 102 are positioned, approximately, on a semi-circle centered around the central target 104, as viewed from a top view. In other examples, the imaging devices 102 may further be positioned at different elevations. For example, the imaging devices 102 may be positioned, approximately, on a sphere centered around the central target 104. The radius of the sphere may vary, for example based on a size of the central target 104. In the present example, five imaging devices 102 are depicted. It will be understood that in other examples, more or fewer imaging devices 102 may be utilized in the system 100.

The control unit 108 is generally configured to control the imaging devices 102. Accordingly, the control unit 108 is operatively coupled to each of the imaging devices 102 via links 106 to initiate the capture of video data by the imaging devices 102, to obtain the video data from the imaging devices 102 and to terminate the capture of the video data by the imaging devices 102. The control unit 108 may further be configured to control other imaging functions of the imaging devices 102. In particular, the control unit 108 provides simultaneous control of the imaging devices 102. Accordingly, the links 106 may be wired connections to enable consistent and simultaneous deliver of initiation and termination signals. The control unit 108 may be, for example, a server based on any suitable server computing environment, a computing device or other suitable controller; examples of certain internal components of the control unit 108 are described further with regards to FIG. 2. The control unit 108 may further be to store the video streams and control the provision of video streams to the client device 112 for playback at the client device 112. In other examples, the system 100 may further include a separate server and/or repository to ore the video streams and control the provision of video streams.

The client device 112 may be a desktop computer, a laptop computer, a server, a kiosk, or other suitable device. In other examples, the client device 112 may be a mobile computing device such as a tablet, smart phone, or the like. The client device 112 is in communication with the control unit 108 to obtain video streams from the control unit 108 and to display the video streams. Examples of certain internal components of the client device 112 will be described in further detail with regards to FIG. 2.

The communication link 110 may be wired or wireless or a combination of wired and wireless communication links. For example, the communication link 110 may be provided by a wireless local area network (WLAN) deployed by one or more access points (not shown). In other examples, the communication link 110 may include one or more wide-area networks such as the Internet, mobile networks, and the like.

The system 100 may further include a microphone 114 to capture audio data. In some examples, the microphone 114 may be integrated with one of the imaging devices 102. Further, in some examples, each of the imaging devices 102 may include a microphone to capture respective audio tracks. In some examples, the microphone 114 may be a stand-alone component, as illustrated in the present example. The microphone 114 is interconnected with the control unit 108 to provide the captured audio data to the control unit 108 for further processing.

Figure 2:
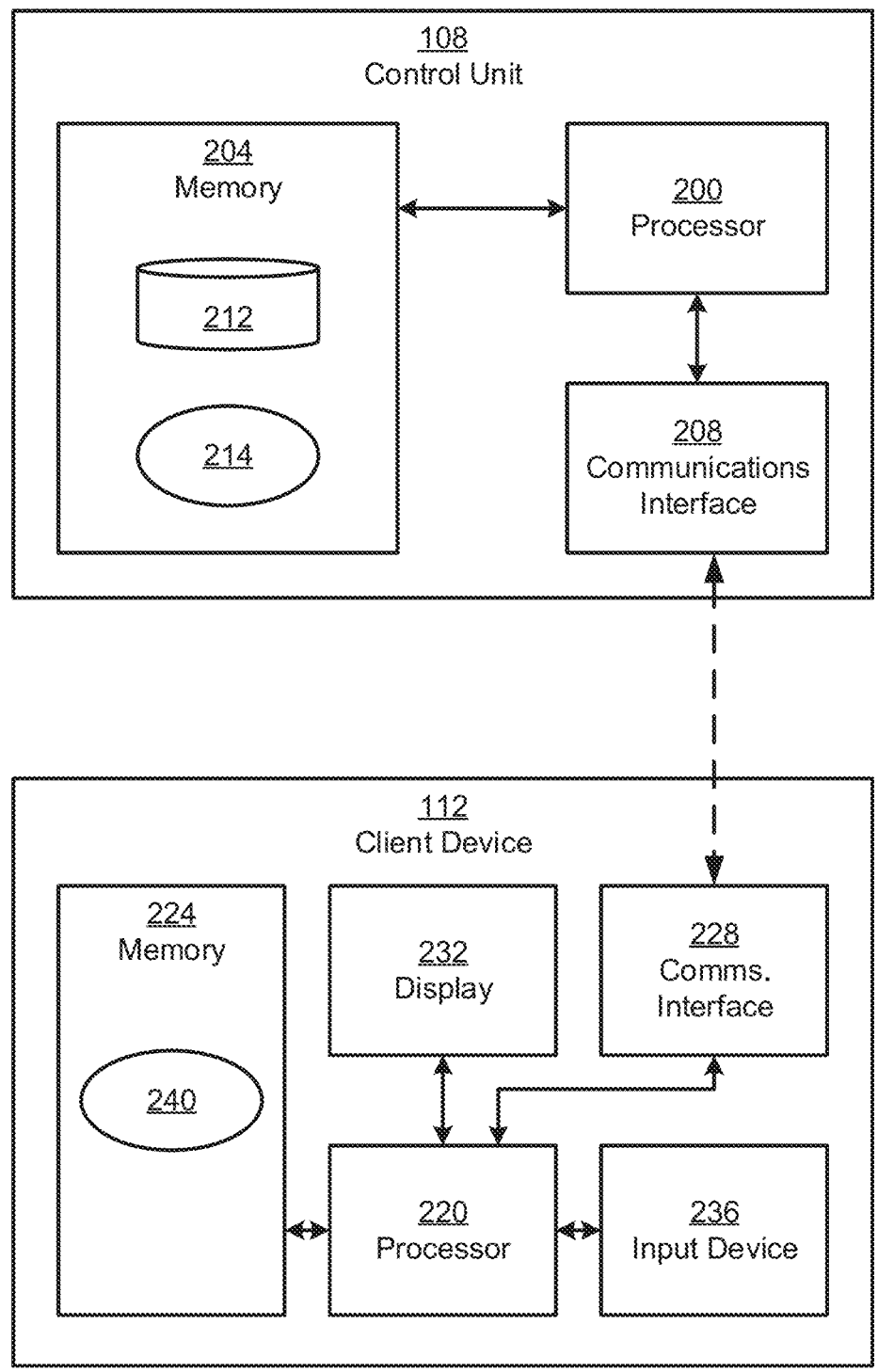
FIG. 2 depicts a block diagram of certain internal components of the control unit and the client device of the system of FIG. 1.

Referring to FIG. 2, a block diagram of certain internal components of the control unit 108 and the client device 112 is depicted.

The control unit 108 includes a processor 200 interconnected with a non-transitory computer-readable storage medium, such as a memory 204, and a communications interface 208. The processor 200 may include a central-processing unit (CPU), a microcontroller, a microprocessor, a processing core, a field-programmable gate array (FPGA) or similar. The processor 200 may include multiple cooperating processors. The processor 200 may cooperate with the memory 204 to realize the functionality discussed herein.

The memory 204 may include a combination of volatile (e.g. Random Access Memory or RAM) and non-volatile memory (e.g. read only memory or ROM, Electrically Erasable Programmable Read Only Memory or EEPROM, flash memory). All or some of the memory 204 may be integrated with the processor 200. The memory 204 stores applications, each including a plurality of computer-readable instructions executable by the processor 200. The execution of the instructions by the processor 200 configures the control unit 108 to perform the actions discussed herein. In particular, the applications stored in the memory 204 include a video control application 214 to control the imaging devices 102 and to generate video streams representing the central target 104.

The memory 204 may also store a repository 212 storing the video streams. The repository 212 may further store identifiers of the imaging devices 102, position data for the imaging devices (e.g., an angle of view of the central target 104, a distance from the central target 104, or the like), and associations to the video streams. For example, the repository 212 may store a spatial plan associating an identifier of an imaging device 102, position data for the imaging device 102, and a corresponding video stream (e.g., as identified by a video stream identifier or the like) captured at the imaging device 102.

The control unit 108 also includes the communications interface 208 interconnected with the processor 200. The communications interface 208 may be configured for wireless (e.g. Bluetooth, Wi-Fi, or other suitable communications protocols) or wired communications and may include suitable hardware (e.g. transmitters, receivers, network interface controllers and the like) to allow the control unit 108 to communicate with other computing devices, such as the client device 112. The specific components of the communications interface 208 are selected based on the type of communication links 110 that the control unit 108 communicates over, as will be apparent to those of skill in the art.

In some examples, the control unit 108 may further include one or more input/output devices (not shown), such as a monitor, display, keyboard, mouse, or the like to allow an operator to operate the control unit 108.

The client device 112 includes a processor 220 interconnected with a non-transitory computer-readable storage medium, such as a memory 224, a communications interface 228, a display 232, and an input device 236. The processor 220 may include a central-processing unit (CPU), a microcontroller, a microprocessor, a processing core, a field-programmable gate array (FPGA) or similar. The processor 220 may include multiple cooperating processors. The processor 220 may cooperate with the memory 224 to realize the functionality discussed herein.

The memory 224 may include a combination of volatile (e.g. Random Access Memory or RAM) and non-volatile memory (e.g. read only memory or ROM, Electrically Erasable Programmable Read Only Memory or EEPROM, flash memory). All or some of the memory 224 may be integrated with the processor 220. The memory 224 stores applications, each including a plurality of computer-readable instructions executable by the processor 220. The execution of the instructions by the processor 220 configures the client device 112 to perform the actions discussed herein. In particular, the applications stored in the memory 224 include a video display application 240 to obtain the video streams representing the central target 104 from the control unit 108 and to display the video streams at the display 232. For example, the video display application 240 may be a native application on a mobile device. In other examples, the video display application 240 may include a web browser application to access web content provided by a web server associated with the control unit 108.

The client device 112 also includes the communications interface 228 interconnected with the processor 220. The communications interface 228 may be configured for wireless (e.g. Bluetooth, Wi-Fi, or other suitable communications protocols) or wired communications and may include suitable hardware (e.g. transmitters, receivers, network interface controllers and the like) to allow the client device 112 to communicate with other computing devices, such as the control unit 108. The specific components of the communications interface 228 are selected based on the type of communication links 110 that the client device 112 communicates over, as will be apparent to those of skill in the art.

The client device 112 further includes the display 232 and the input device 236. The display 232 may include an integrated display, such as a screen on a mobile device, or a laptop computer, or it may include a separate display interconnected with a computing device, such as a monitor for a computer tower, or other suitable devices for providing a graphical display. The input device 236 may include a touchscreen, a keyboard, a mouse, or other suitable devices for allowing input to be received by the client device 112.

Figure 3A:
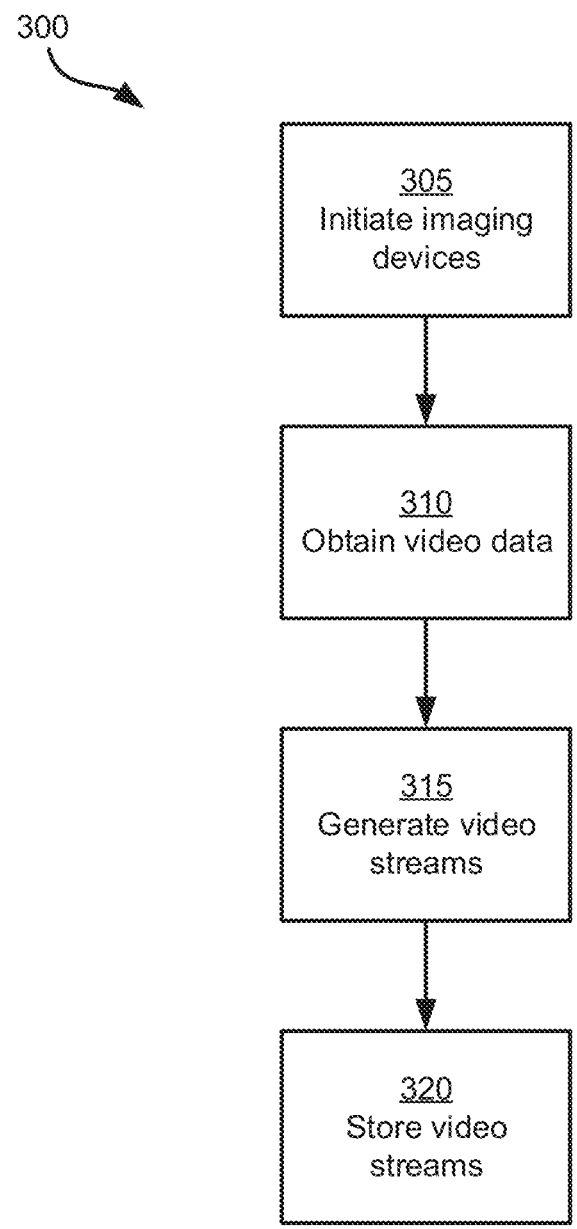
FIG. 3A depicts a flowchart of a method of generating video streams in the system of FIG. 1.

FIG. 3A depicts a flowchart of a method 300 for generating video streams. The method 300 will be described in conjunction with its performance in the system 100, and in particular, by the processor 200 of the control unit 108 via execution of the video control application 214. The blocks of the method 300 may be performed concurrently and/or in an order different from that depicted, and accordingly are referred to as blocks and not steps. For example, in some examples, the video streams may be generated in real-time, and hence the blocks may be performed concurrently. In some examples, the method 300 may be performed by other suitable devices and/or systems.

The method 300 is initiated at block 305. The method 300 may be initiated, for example, in response to an input from an operator of the system 100. The input may be received, for example, at an input device of the control unit 108, or remotely via the communications interface. At block 305, the processor 200 initiates the imaging devices 102. More specifically, the processor 200 may send an initiation signal via the links 106 simultaneously to the imaging devices 102 to initiate the capture of video data by the imaging devices 102.

At block 310, the processor 200 obtains video data from the imaging devices 102. In particular, the video data represents the central target 104 from respective angles of view of the imaging devices 102.

At block 315, the processor 200 generates video streams based on the video data obtained at block 310. In particular, the video streams are to be provided to the client device 112 for display. In some examples, the video streams may be obtained directly from the video data captured by a single imaging device 102. In other examples, the video streams may be computer-generated based on one or more of the imaging devices 102. For example, the processor 200 may aggregate first video data from the first imaging device 102-1 with second video data from the second imaging device 102-2 to obtain a video stream representing the central target 104 from an intermediate angle of view (i.e., an angle of view in between the first angle of view of the first imaging device 102-1 and the second angle of view of the second imaging device 102-2).

Figure 3B:
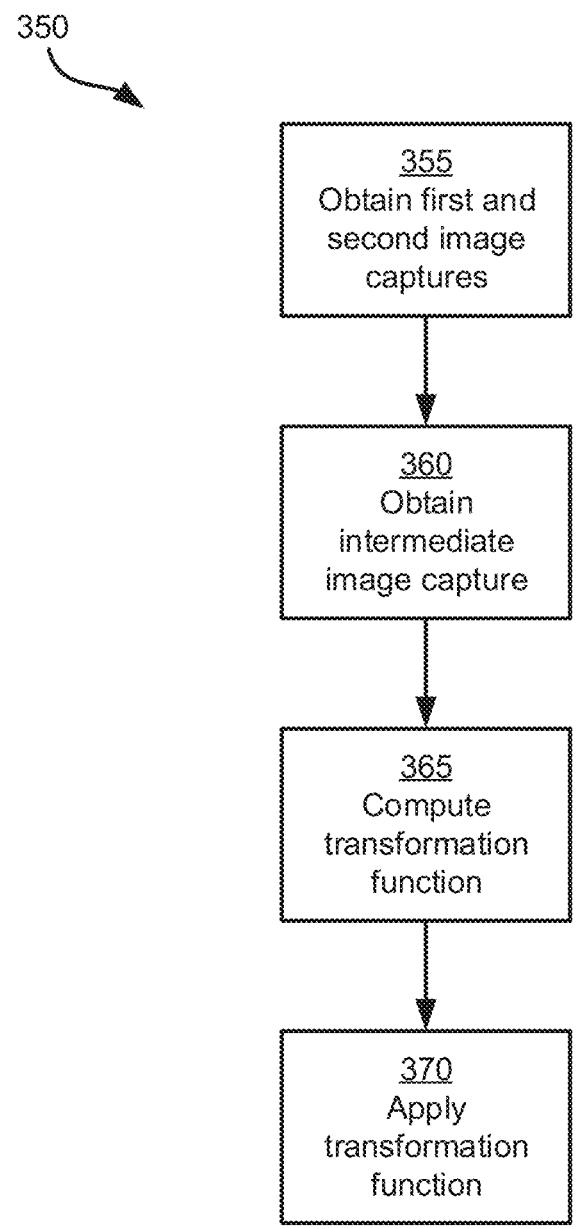
FIG. 3B depicts a flowchart of a method of generating video streams at block 315 of the method of FIG. 3A.

For example, referring to FIG. 3B, an example method 350 of aggregating video data to obtain a computer-generated video stream is depicted. In particular, the control unit 108 uses first and second video streams (i.e., from first and second angles of view) as captured from two of the imaging devices 102 to generate an intermediate video stream representing the central target 104 from an intermediate angle of view between the first and second angles of view.

At block 355, the processor 200 obtains a first image capture of the central target 104 from a first angle of view and second image capture of the central target 104 from a second angle of view. In particular, the first and second angles of view preferably correspond to imaging devices 102 which capture video streams. The first and second image captures may be obtained, for example, during setup of the system 100. The first and second image captures may be obtained by a separate imaging device, or using a frame captured by one of the imaging devices 102.

At block 360, the processor 200 obtains an intermediate image capture representing the central target 104 from an intermediate angle of view between the first and second angles of view. The intermediate image capture is preferably obtained at or substantially at the same time as the first and second video captures, for example, during setup of the system 100. The intermediate image capture may be obtained by a separate imaging device.

At block 365, the processor 200 compares the first image capture, the second image capture and the intermediate image capture to compute a transformation function to generate the third image capture from the first image capture and the second image capture. The transformation function may be, for example, a matrix to apply to the first and second image captures to obtain the intermediate image capture. In some examples, the transformation function may include a machine learning model, such as a neural network to obtain the intermediate image capture from the first and second image captures.

At block 370, the processor 200 applies the transformation function computed at block 365 to first and second video streams obtained from the first and second imaging devices 102. In particular, since the first, second and intermediate image captures have the same spatial relationship as the first, second and desired intermediate video streams, the transformation function computed to obtain the intermediate image capture may similarly be applied to the first and second video streams to obtain an intermediate video stream representing the central target 104 from the intermediate angle of view. For example, the processor 200 may apply the transformation function to each frame of the first and second video streams. Additionally, since the imaging devices 102 are controlled to synchronously capture the video data of the central target 104, the first and second video streams are time-aligned and therefore corresponding frames represent the central target at the same time.

Returning to FIG. 3A, at block 320, the processor 200 stores the video streams generated at block 315 in the repository 212. In particular, the processor 200 may store the video stream in association with the angle of view of the video stream and/or position data defining the position of the video stream source, relative, for example, to the central target 104. For example, for video streams obtained directly from an imaging device 102, the processor 200 may store the video stream in association with the position of the source imaging device 102. For video streams obtained via a computer-generated method, such as the method 350, the processor 200 may store the intermediate video stream in association with the intermediate angle of view and the position at which the intermediate image capture was obtained.

Figure 4A:
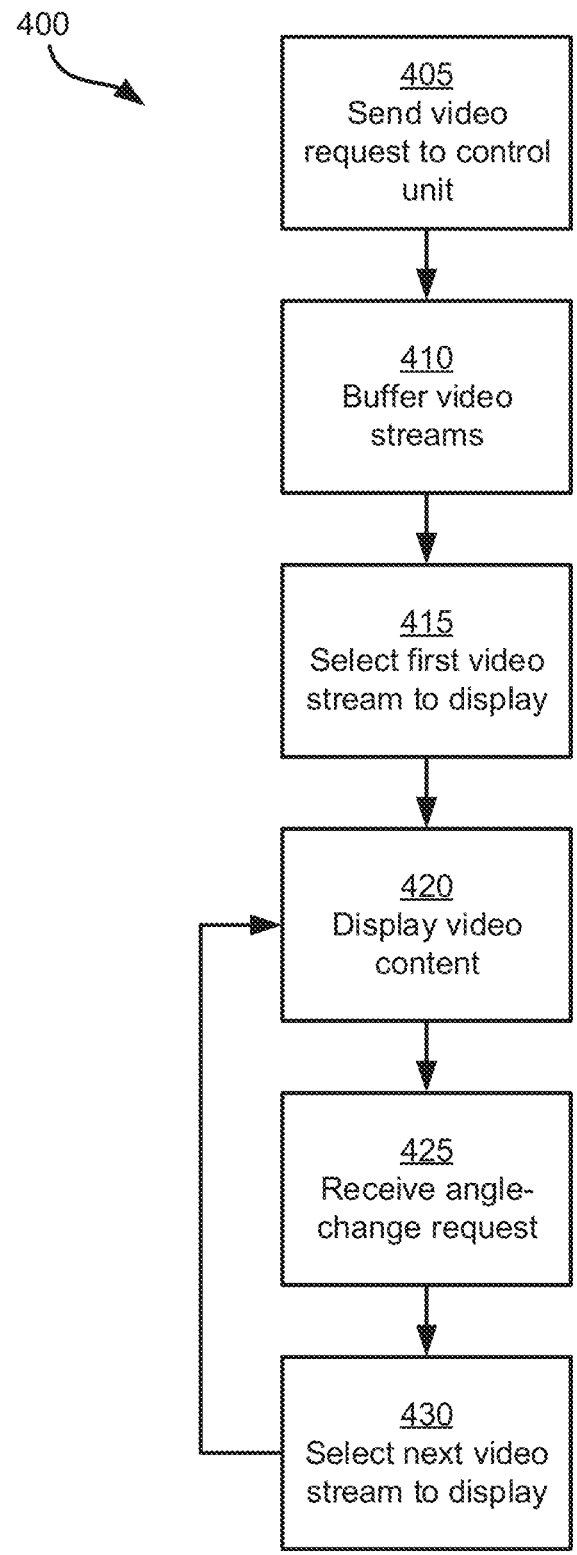
FIG. 4A depicts a flowchart of a method of switching video streams in the system of FIG. 1.

FIG. 4A depicts a flowchart of a method 400 for switching between video streams. The method 400 will be described in conjunction with its performance in the system 100, and in particular, by the processor 220 of the client device 112 via execution of the video display application 240, when the client device 112 is responsible for selecting the appropriate video stream to display. In some examples, the blocks of the method 400 may be performed concurrently and/or in an order different from that depicted, and accordingly are referred to as blocks and not steps. For example, the video streams may be displayed at the client device in real-time, and hence some blocks may be performed concurrently. Further, the method 400 may be performed concurrently with the method 300. In some examples, the method 400 may be performed by other suitable devices and/or systems.

The method 400 is initiated at block 405, for example in response to an initiation signal generated based on input from an operator of the client device 112. For example, the operator may use the input device 236 to initiate display of video content. At block 405, the processor 220 generates a video request for the requested video content. The client device 112 sends the video request to the control unit 108.

At block 410, the client device 112 receives the video streams for the requested video content from the control unit 108, for example via the communication link 110. In particular, the client device 112 may receive the video streams associated with each of the imaging devices 102, as well as computer-generated video streams representing the central target 104 from intermediate angles of view. The processor 220 buffers the video streams to allow for efficient switchover between the video streams. The client device 112 may additionally receive an audio stream corresponding to the video content.

At block 415, the processor 220 selects a first video stream to display. For example, the initiation signal may include a selected video stream to display, as identified, for example, based on the angle of view of the video stream. In other examples, the processor 220 may arbitrarily select one of the video streams to display or may select one of the video streams to display based on a default flag associated with the video streams.

At block 420, the processor 220 then displays the selected video stream at the display 232 as the requested video content. In particular, the video content may be displayed at a video playback region of the display 232 (e.g., as defined by a user interface of the video display application). The audio stream may be played concurrently with the video content.

At block 425, the client device 112 receives an angle-change request, in particular, at the input device 236. In some examples, the request may include an identification of a specific video stream to switch to. For example, the operator of the client device 112 may select a particular video stream, from a drop-down list of available video streams.

In other examples, the angle-change request may include a direction. In particular, the direction may be relative to the current video stream. For example, the direction may be obtained based on a gesture input received at the input device 236. For example, the operator may use a swiping motion on a touchscreen display, a click and drag gesture using a mouse, tapping or double-tapping within predefined portions of the input device 236, and the like. In such examples, the input device 236 may correspond to the video playback region of the display 232. That is, the video display application may define the video playback region of the display 232 as a region which accepts gestures as inputs (i.e., gesture inputs). In response to the gesture, the processor 220 may resolve the gesture to determine a direction and associate the determined the direction with the angle-change request.

In other examples, the direction may be obtained by other direct input received at the input device 236. For example, the direction may be indicated based on predefined keyboard inputs (e.g., based on arrowkeys on a keyboard, or based on selected direction buttons provided at a user interface of the client device 112.

At block 430, in response to the angle-change request, the processor 220 selects a second video stream (i.e., the next video stream) for display as the video content. For example, where the angle-change request specifies a particular video stream, the processor 220 may select the specified video stream as the next video stream. Where the angle-change request specifies a direction, the processor 220 may select the next video stream based on the current video stream and the direction.

In particular, the processor 220 may obtain a spatial plan of the video streams, wherein the spatial plan defines a position for each video stream. For example, the processor 220 may obtain the spatial plan from the control unit 108. In other examples, the processor 220 may determine the spatial plan based on position data associated with each video stream. The processor 220 may then determine a source position of the first or current video stream. The processor 220 may then select, based on the spatial plan, the video stream having the closest position to the source position in the direction defined in the angle-change request. That is, the processor 220 may define a surface of the positions of the video streams (e.g., using the surface of a sphere about the central target 104) and select the closest video stream in the direction of the angle-change request. If no such video stream exist, the processor 220 may end the method 400 or produce a notification for display at the display 232 indicating to the operator that no further video streams exist in the requested direction. As will be appreciated, in some examples, the positions of the video streams may not precisely correspond with the requested direction, and accordingly, the processor 220 may use a sector about the direction defined in the angle-change request to select the video stream having the closest position to the source position. For example, the processor 220 may define a sector about the direction defined in the angle-change request and select the video stream with the shortest distance to the source position within the defined sector. Various measures of distance, such as Euclidean distance or spherical distance may be utilized to select the closest video stream.

After having selected the next video stream to display at block 430, the method 400 returns to block 420 to display the selected video stream as the video content. In particular, the processor 220 switches the video content from the first video stream selected at block 415 to the second video stream selected at block 425. In particular, having buffered the video streams at block 410, the processor 220 may simply stop the first video stream at a given timestamp and start the second video stream at the same timestamp. Notably; since the video streams are synchronously recorded, the timestamp of the video will correspond to the same video time, and hence the transition between video streams and/or angles of view provides continuity of time in the video content. In some examples, the processor 220 may apply imaging filters to the video streams to smooth the visual transition between video streams.

In some examples, to account for any lag in processing or switching, the second video stream may be synchronized with the time of the audio stream. In particular, the audio stream may continue during the switch from the first video stream to the second video stream, and hence may serve as a reference time. That is, the audio stream may be a master audio stream; rather than individual audio streams corresponding to each video stream. As will be appreciated, in other examples, the audio data may be integrated with the video streams and may therefore also switch over with the switching of the video streams.

The method 400 may be used, for example, when the requested video content is short (e.g., under about 5 minutes) or below a threshold data size to allow each video stream to be buffered at the client device 112.

Figure 4B:
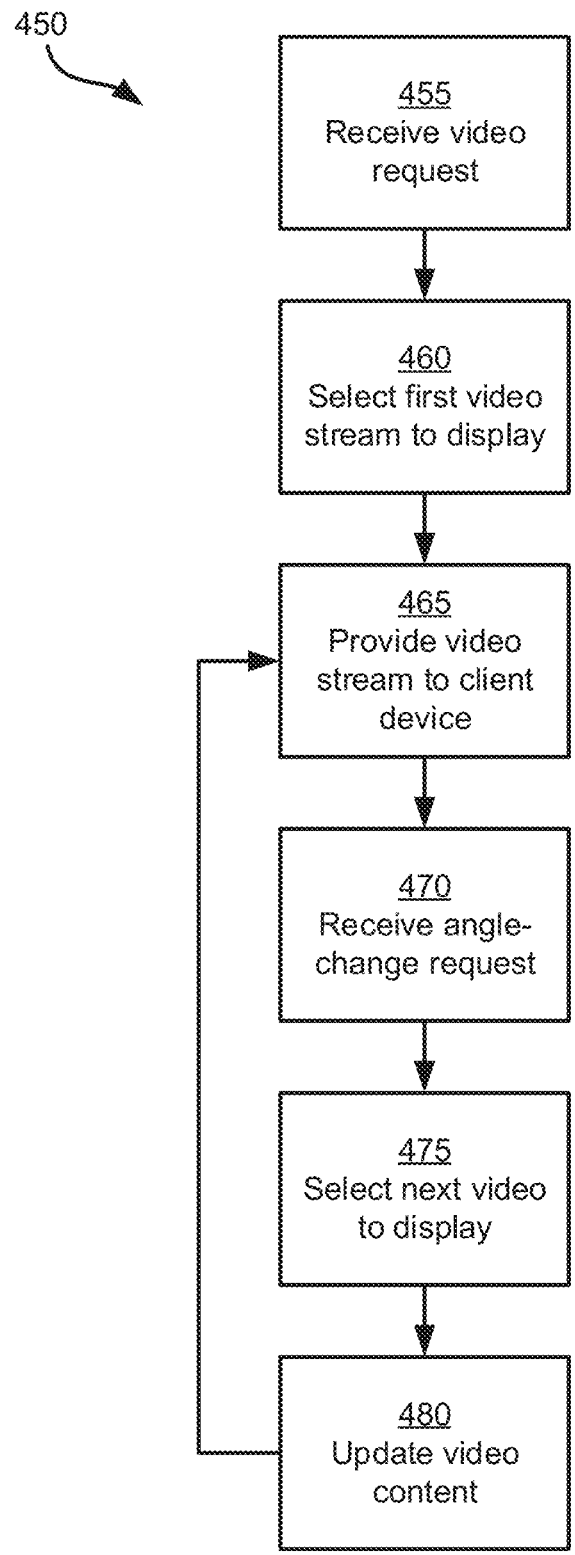
FIG. 4B depicts a flowchart of another method of switching video streams in the system of FIG. 1.

FIG. 4B depicts a flowchart of another method 450 for switching between video streams. The method 450 will be described in conjunction with its performance in the system 100, and in particular, by the processor 200 of the control unit 108 via execution of the video display application 214, when the control unit 108 responsible for selecting the appropriate video stream to display. In some examples, the blocks of the method 450 may be performed concurrently and/or in an order different from that depicted, and accordingly are referred to as blocks and not steps. For example, the video streams may be displayed at the client device in real-time, and hence some blocks may be performed concurrently. Further, the method 450 may be performed concurrently with the method 300. In some examples, the method 450 may be performed by other suitable devices and/or systems.

The method 450 is initiated at block 455. At block 455, the control unit 108 receives a video request from the client device 112. The video request may originate at the client device 112, for example, in response to an input from an operator of the client device 112 to initiate display of video content. In particular, the video request may specify the video content of the video request.

At block 460, the processor 200 selects a first video stream to display. For example, the video request may include a selected video stream to display, as identified, for example, based on the angle of view of the video stream. In other examples, the processor 200 may arbitrarily select one of the video streams to display or may select one of the video streams to display based on a default flag associated with the video streams.

At block 465, the control unit 108 provides a main video stream to the client device 112. In particular, the main video stream may be the first video stream and/or include the first video data associated with the first video stream. In some examples, the control unit 108 may additionally provide an audio stream associated with the main video stream.

At block 470, the control unit 108 receives an angle-change request. In some examples, the request may include an identification of a specific video stream to switch to. For example, the operator of the client device 112 may select a particular video stream, from a drop-down list of available video streams. In other examples, the angle-change request may include a direction.

At block 475, in response to the angle-change request, the control unit 108 selects a second video stream (i.e., a next video stream) to provide to the client device 112. For example, where the angle-change request specifies a particular video stream, the processor 200 may select the specified video stream as the next video stream. Where the angle-change request specifies a direction, the processor 200 may select the next video stream based on the current video stream and the direction.

In particular, the processor 200 may obtain a spatial plan of the video streams, wherein the spatial plan defines a position for each video stream. For example, the processor 200 may retrieve the spatial plan from the repository 212. In other examples, the processor 200 may determine the spatial plan based on position data associated with each video stream. The processor 200 may then determine a source position of the first or current video stream. The processor 200 may then select, based on the spatial plan, the video stream having the closest position to the source position in the direction defined in the angle-change request. That is, the processor 200 may planarize the spatial plan (e.g., using the surface of a sphere about the central target 104) and select the closest video stream in the direction of the angle-change request. If no such video stream exist, the processor 200 may end the method 400 or generate a notification to provide to the client device 112 indicating to the operator that no further video streams exist in the requested direction. As will be appreciated, in some examples, the positions of the video streams may not precisely correspond with the requested direction, and accordingly, the processor 200 may use a sector about the direction defined in the angle-change request to select the video stream having the closest position to the source position.

At block 480, the processor 200 updates the main video stream with the video stream selected at block 475. In particular, the processor 200 switches the video content from the first video stream selected at block 460 to the second video stream selected at block 475. For example, the processor 200 may update the main video stream being provided to the client device 112 to reference the second video stream or the second video data. Notably, since the video streams are synchronously recorded, the timestamp of the video will correspond to the same video time, and hence the transition between video streams and/or angles of view provides continuity of time in the video content.

In some examples, to account for any lag in processing or switching, the second video stream may be synchronized with the time of the audio stream. In particular, the audio stream may continue during the switch from the first video stream to the second video stream, and hence may serve as a reference time. That is, the audio stream may be a master audio stream, rather than individual audio streams corresponding to each video stream. As will be appreciated, in other examples, the audio data may be integrated with the video streams and may therefore also switch over with the switching of the video streams.

After having updated the main video stream at block 480, the method 450 returns to block 465 to continue to provide the main video stream to the client device 112.

The method 450 may be used, for example, when the requested video content is longer or above a threshold data size, or when the video streams may otherwise be difficult or impractical to buffer at the client device 112. The method 450 may additionally be used for example when live-streaming video content from the imaging devices 102.

Figure 5A:
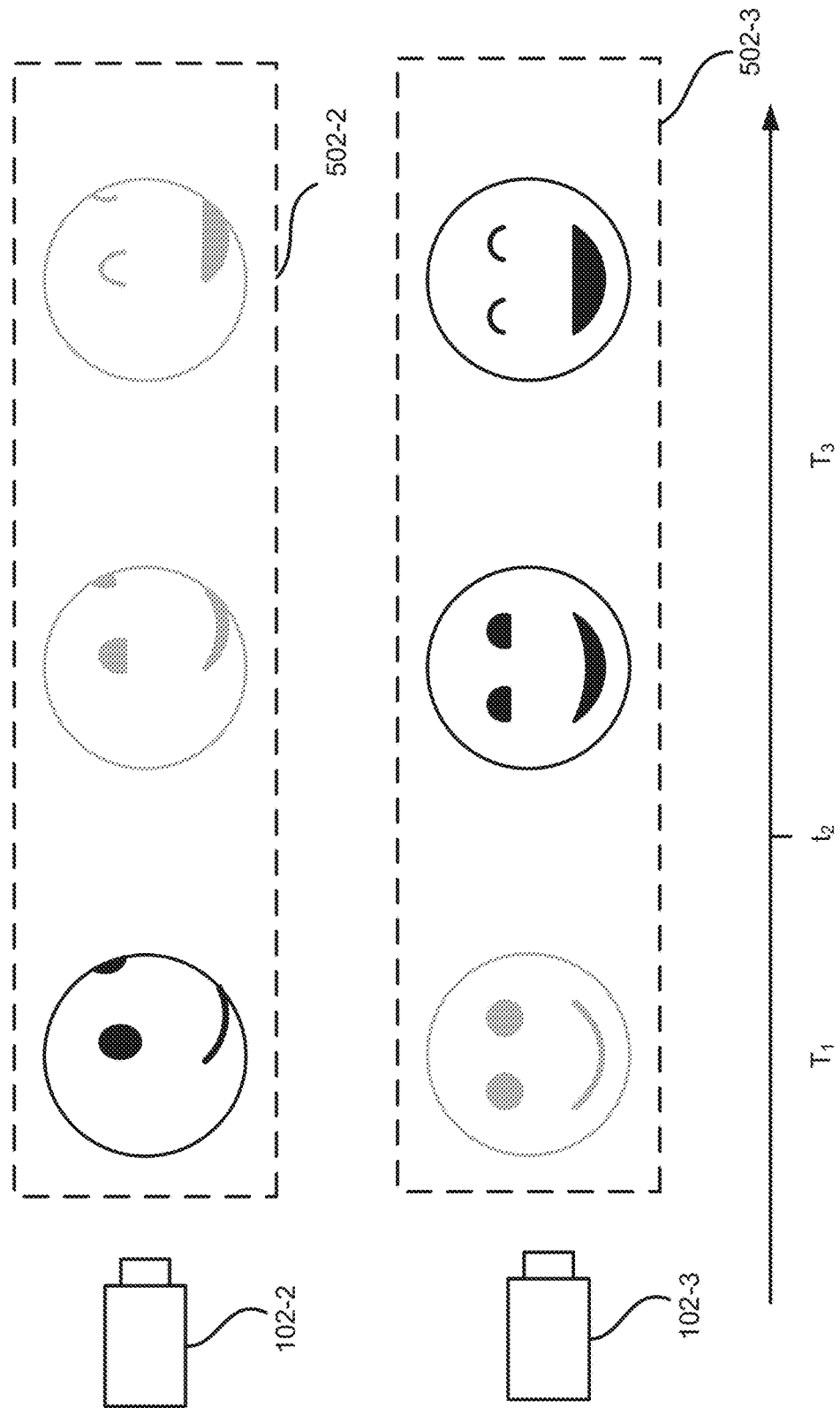
FIG. 5A depicts a schematic of video streams during the performance of the method of FIG. 4A.

FIG. 5A depicts a schematic of video streams in the system 100, as provided by the processor 220 of the client device 112. In particular, the processor 220 may buffer video streams 502-2 and 502-3 associated with the second imaging device 102-2 and the third imaging device 102-3, respectively. The processor 220 may also buffer video streams associated with the other imaging devices 102 (not shown). In particular, the entirety of the video streams 502-2 and 502-3 are buffered.

During the time period $T_1$, the processor 220 displays the video stream 502-2 associated with the second imaging device 102-2 and depicting the central target 104 from an approximately 45° angle of view, as depicted by the active (not grayed out) frame representations. The video stream 502-2 may include image data including any movements and motions of the central target 104 or around the central target 104 within the field of view of the second imaging device 102-2.

At time $t_2$, an operator may input an angle-change request at the client device 112. For example, the operator may swipe on the video playback region of the display 232 from the right to left. The processor 220 may resolve the right-to-left swiping gesture to determine that the operator wishes to move in a direction to the right. Accordingly, the request may be associated with a "right" direction. Based on the spatial plan of the imaging devices 102, the processor 220 may determine that the third imaging device 102-3 is closest to the right of the second imaging device 102-2, and hence the video stream 502-3 associated with the third imaging device 102-3 may be selected. Thus, at time $t_2$, the video content displayed at the display 232 switches from the video stream 502-2 to the video stream 502-3.

Subsequently, during the time period $T_3$, the video stream 502-3 is displayed, as depicted by the active frame representations.

As will be appreciated, the processor 220 can switch seamlessly between the video streams 502-2 and 502-3 at time $t_2$ based on the synchronicity of the video data initially captured by the imaging devices 102. Further, the processor 220 buffers all the video streams, but may only display one active video stream at a time, while the other video streams are inactive.

FIG. 5B depicts a schematic of video streams in the system 100, as provided by the processor 200 of the control unit 108 using the same video streams 502-2 and 503-2 as in FIG. 5A. In particular, the processor 200 further generates video content (i.e., a main video stream) 504 which is provided to the client device 112.

During the time period $T_1$, the video content 504 references the video stream 502-2. At time $t_2$, in response to the angle-change request, the processor 200 may similarly determine that the third imaging device 102-3 is closest to the right of the second imaging device 102-2, and hence the video stream 502-3 associated with the third imaging device 102-3 may be selected, Thus, at time $t_2$, the video content 504 provided to the client device 112 switches from referencing the video stream 502-2 to referencing the video stream 502-3. Subsequently, during the time period $T_3$, the video content 504 references the video stream 502-3.

As will be appreciated, the seamless switching between video streams 502-2 and 502-3 at time $t_2$ is maintained based on the synchronicity of the video data initially captured by the imaging devices 102. Since processing is performed by the processor 200 at the control unit 108, the control unit 108 may provide a single video stream 504 to the client device 112 for display.

Accordingly, operators of the client device may view efficiently switch between video streams representing different angles of view of the central target 104. In some examples, the video streams may be pre-stored, while in other examples, the video streams may be live streams.

As will be appreciated, other variations of the presently described system are possible. For example, rather than imaging devices capturing video data, the system may employ other media capture devices configured to capture other media data, such as a plurality of microphones oriented about a central target to capture audio data from different angles relative to the central target. The system may therefore allow a user to efficiently switch back and forth between the different audio streams to listen to the differences in acoustics at the different capture angles.

The scope of the claims should not be limited by the embodiments set forth in the above examples, but should be given the broadest interpretation consistent with the description as a whole.

The invention claimed is:

1. An imaging system comprising:
   a first imaging device oriented towards a central target to capture first video data representing the central target from a first angle of view;
   a set of further imaging devices oriented towards the central target to capture further video data representing the central target from further angles of view; and
   a control unit interconnected with the first imaging device and the set of further imaging devices, the control unit to:
   control the first imaging device, and the set of further imaging devices to synchronously capture the first video data and the further video data;
   in response to a video request, provide, to a client device, a video stream of the first video data representing the central target from the first angle of view; and
   obtain a spatial plan of the first video data;
   determine a source position of the first video data;
   in response to an angle-change request, wherein the angle-change request defines a direction, select, based on the spatial plan, closest video data as second video data, wherein the closest video data has a closest position to the source position in the direction defined in the angle-change request;
   switch the video stream to the second video data representing the central target.

2. The imaging system of claim 1, further comprising:
   a microphone to capture audio data; and
   wherein the control unit is further to:
   control the microphone to capture the audio data synchronously with the first video data and the second video data; and
   in response to the video request, provide, to the client device, the audio data.

3. The imaging system of claim 1, wherein the control unit is further to:
   obtain a first image capture of the central target from the first angle of view;
   obtain a second image capture of the central target from a second angle of view, the second angle of view selected from the further angles of view;
   obtain an intermediate image capture of the central target from an intermediate angle of view, wherein the intermediate angle of view is between the first angle of view and the second angle of view;
   compute a transformation function to generate the intermediate image capture from the first image capture and the second image capture; and
   apply the transformation function to the first video data and second video data, the second video data selected from the further video data and corresponding to the second angle of view, to obtain intermediate video data associated with the intermediate angle of view; and store the intermediate video data as part of the further video data.

4. The imaging system of claim 1, wherein the first imaging device and the set of further imaging devices are approximately equidistant from the central target.

5. The imaging system of claim 1, wherein the first imaging device and the set of further imaging devices comprise optical cameras.

6. A computing device comprising:
   a display;
   an input device;
   a memory; and
   a processor interconnected with the display, the input device and the memory, the processor configured to:
      receive, at the input device, a video request to view video content of a central target;
      in response to the video request, obtain a set of video streams of the central target, each video stream representing the central target from a different angle of view,
      obtain a spatial plan of the video streams, the spatial plan defining a position for each video stream in the set;
      determine a source position of the first video stream;
      select a first video stream from the set to display at the display;
      receive, at the input device, an angle-change request defining a direction;
      select, based on the spatial plan, closest video stream as the second video stream from the set to display, wherein the closest video stream has a closest position to the source position in the direction defined in the angle-change request; and
      switch the video content from the first video stream to the second video stream.

7. The computing device of claim 6, wherein the angle-change request comprises a gesture received at the input device; and wherein the processor is configured to resolve the gesture to determine the direction defined by the angle-change request.

8. The computing device of claim 6, wherein the processor is further configured to:
   in response to the video request, obtain an audio stream; and
   play the audio stream concurrently with the video content.

9. The computing device of claim 6, wherein the processor is configured to play the video at a video playback region of the display.

10. The computing device of claim 9, wherein input device corresponds to the video playback region of the display.

11. A method comprising:
    displaying a first video stream representing a central target from a first angle of view;
    receiving an angle-change request including a direction;
    obtaining a spatial plan of video streams in a set of video streams, the set of video streams including the first video stream;
    determining a source position of the first video stream;
    selecting, based on the spatial plan, a second video stream from the set of video streams, wherein the second video stream has a closest position to the source position in the direction defined in the angle-change request; and
    displaying the selected second video stream.

12. The method of claim 11, wherein receiving the angle-change request comprises:
    detecting a gesture at an input device; and
    resolving the gesture to determine the direction.

13. The method of claim 11, wherein selecting the second video stream comprises:
    defining a sector about the direction; and
    selecting, as the second video stream, the video stream having a shortest distance to the source position within the defined sector.

* * * * *